June 16, 1964
G. S. WING
3,137,336
TWO-PART PANEL FASTENER HAVING RESILIENT
RETAINING MEANS FOR RETAINING A SCREW
Filed May 12, 1960
2 Sheets-Sheet 1
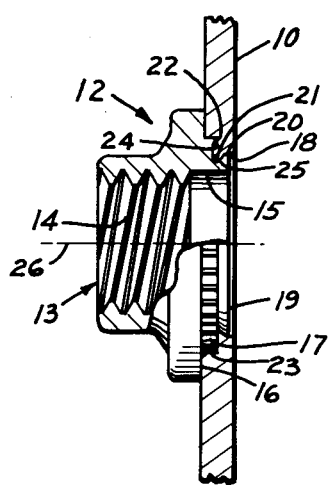
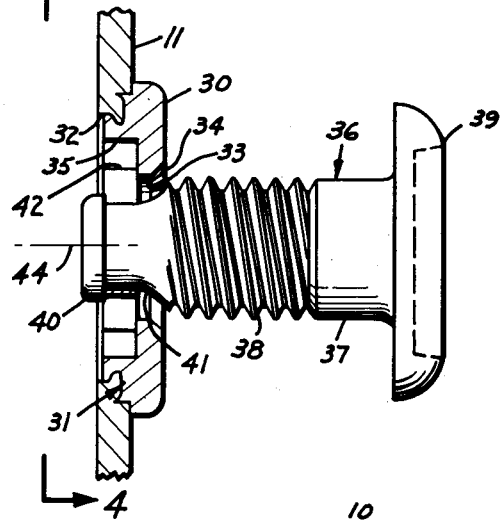
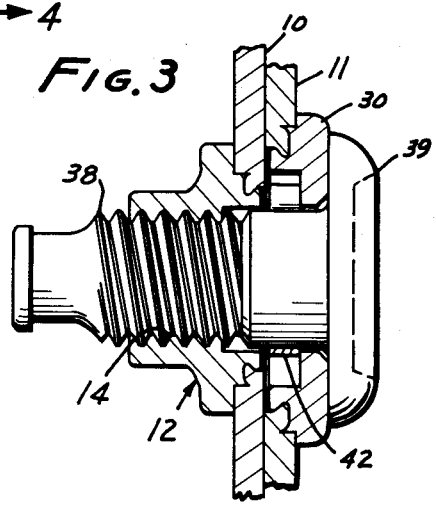
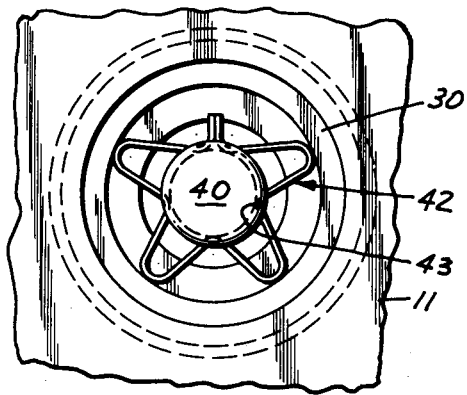
INVENTOR.
GEORGE S. WING
BY Angus & Mon
ATTORNEYS.

June 16, 1964
G. S. WING
3,137,336
TWO-PART PANEL FASTENER HAVING RESILIENT
RETAINING MEANS FOR RETAINING A SCREW
Filed May 12, 1960
2 Sheets-Sheet 2
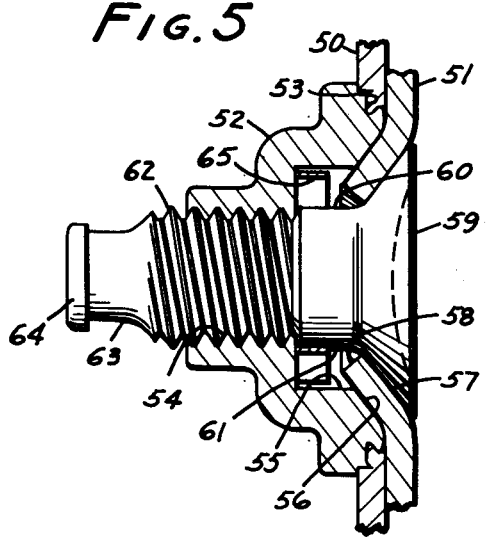
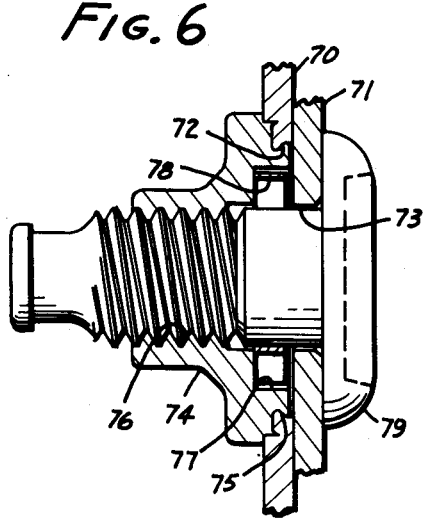
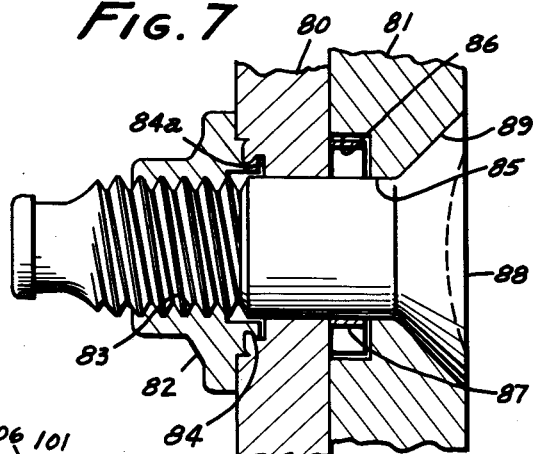
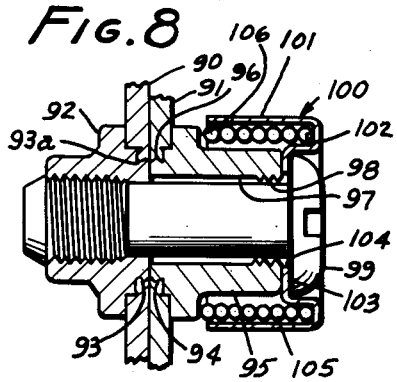
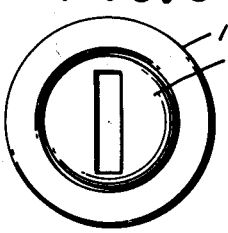
INVENTOR.
GEORGE S. WING
BY
Angus & Mon
ATTORNEYS.

United States Patent Office 3,137,336
Patented June 16, 1964

3,137,336
TWO-PART PANEL FASTENER HAVING RESILIENT RETAINING MEANS FOR RETAINING A SCREW
George S. Wing, Palos Verdes Estates, Calif., assignor to Hi-Shear Rivet Tool Company, Torrance, Calif., a corporation of California
Filed May 12, 1960, Ser. No. 28,606
2 Claims. (Cl. 151—41.73)

This invention relates to a fastener of the type known generally as a panel fastener whose function is to detachably secure two bodies together.

The most frequent use for a panel fastener is to attach a body such as a cover plate to some supporting structure. There are, of course, many conventional types of panel fastener devices, but in general they suffer from one or more of the following disadvantages: complicated structural configuration, complicated or expensive means for attachment to the bodies to be joined, and unreliable holding power when joined.

It is an object of this invention to provide a panel fastener whose two separable parts may both be attached by simple means to their respective structures, and in which the movable parts of the panel fastener are not readily detached from the portion of the fastener with which they are associated. It is a further object of this invention to provide a panel fastener which can tolerate certain errors of alignment between the two parts, so that the assembly in which the panel fastener is incorporated may have relatively wide dimensional tolerances.

Still another object of the invention is to provide a panel fastener whose parts are drawn toward each other and which clamp their respective bodies against each other in a positive grip to provide a tight, vibration-proof joint.

A panel fastener according to this invention includes a screw passing through one of said bodies, and means to retain the screw. The screw has a head on one end and a thread on its shank. Preferably, but not necessarily, there is a retainer adapted to be attached to a respective one of the bodies, the retainer keeping the screw.

The other part of the panel fastener is a receptable which also is adapted to be attached to one of the bodies. The receptacle has a threaded opening therein which is adapted to receive and to engage with the thread on the screw shank, whereby the screw many be threaded into the opening in the receptacle, the threads tightened down, and the fastener thereby assembled.

According to a preferred but optional feature of the invention, the means for retaining the screw to the retainer comprises a spring adapted to engage with an enlarged portion on the screw for holding the screw against falling out of the retainer.

According to still another preferred but optional feature of the invention, springing means are opposed between a shoulder on the retainer and the head of the screw for biasing the head of the screw away from the retainer so as to render the device more easily handled during assembly.

According to still another preferred but optional feature of the invention, the means for retaining the screw in the retainer may comprise a thread inside the passage of the retainer through which the thread must be passed to insert the screw into the retainer, the remainder of the passage being bored out so as to give full clearance to the thread on the screw.

The above and other features of this invention will be fully understood from the following detailed description and the accompanying drawings, in which:

FIG. 1 is a side view, partly in cutaway cross-section, of one portion of a fastener according to the invention;

FIG. 2 is a side view, partly in cutaway cross-section, showing another portion of a fastener according to the invention;

FIG. 3 is a side view, partly in cutaway cross-section, showing the parts of FIGS. 1 and 2 joined together;

FIG. 4 is a cross-section taken at line 4—4 of FIG. 2;

FIGS. 5, 6 and 7 are side views, partly in cutaway cross-section, showing other embodiments of the invention;

FIG. 8 is a side view, partly in cutaway cross-section, showing the presently-preferred embodiment of the invention; and FIG. 9 is an end view of a portion of the device of FIG. 8.

FIGS. 1 and 2 show the two portions of a panel fastener according to the invention adapted to join bodies 10 and 11 together. FIG. 1 illustrates a receptacle 12 which is attached to body 10.

The receptacle has an opening 13 with interior threads 14 and a counterbore 15. The exterior surface of the receptacle includes a shoulder 16 adapted to abut against body 10, and attach means 17 for attaching the receptacle to the body at an opening 18.

The attach means comprise a particular configuration of the outer surface of the receptacle adjacent to face 19. Immediately adjacent to this face there is a guide section 20 which closely fits the diameter of the hole 18 in the body to center the receptacle. Adjacent to guide section 20, and on the other side thereof from face 19, there is a groove 21 which is overhung by a sharp-pointed lip 22. The lip has a cylindrical surface 23 modified by an axial knurl. In smaller sizes of receptacles, the surface has the appearance of a circumferential row of teeth. The under, curved surface 24 of lip 22 overhangs at least part of the groove.

The receptacle is attached to the body by pressing it into the opening, the guide section serving to guide and center the receptable, and the curved surface of the lip in combination with the point, serving to form a circumferential chip 25 that is deflected into the groove. The chip overhangs the guide section and holds the receptacle to the body. The knurled surface holds the device against rotation by its engagement to the body. Shoulder 16 locates and aligns axis 26 of the receptacle, and also provides a firm abutment between the receptacle and the body. The receptacle is thus firmly and non-rotatively attached to body 10, and will remain so.

The other portion of the fastener is shown in FIG. 2, wherein a retainer 30 has attach means 31, identical to attach means 17, which hold the retainer in an opening 32 in body 11. The retainer has a central hole 33 therethrough with a countersink 34 at one end and a counterbore 35 at the other.

A screw 36 fits loosely in hole 33. The screw has a shank 37 with a thread 38 thereon. At one end, it has a head 39, and at the other it has a collar 40. Between the thread and the collar there is a tapered section 41. The means for retaining the screw in the retainer comprise a spring 42 having convoluted fingers 43 which are adapted to fit against the tapered section and catch collar 40 as shown in FIG. 2, when the panel fastener is disengaged, thus holding the screw from being separated from the retainer.

The retainer is held to body 11 by its attach means in the same manner as the receptacle is held to its respectively body.

The diameter of central hole 33 is somewhat greater than the diameter of the threads and the shank of the screw so that the screw can shift sidewise relative to the axis 44 of the hole to compensate for slight differences of alignment between the receptacle and the retainer when the bodies are brought together to form an assembly.

FIG. 3 shows the panel fastener of FIGS. 1 and 2 assembled with bodies 10 and 11 brought against each other, and threads 38 of the screw threaded into threads 14 of the retainer. It will be seen that as the screw passes through the spring, the spring is expanded by the tapered section to pass over the threads and onto the unthreaded portion of the shank. When the screw is unthreaded, the spring will be held in the counterbore, bearing on the threads as they pass by, until the tapered section arrives at the spring. At that time, the threads are disengaged from the receptacle, and the spring bears on the tapered section and ejects the screw from the receptacle. The spring keeps the screw from falling out by catching the collar.

FIG. 5 shows an alternate embodiment of panel fastener in an assembled condition. This fastener is a flush fastener, as compared to that of FIGS. 1–4 which projects outwardly from the "front" body. This device joins bodies 50, 51. Body 50 carries a receptacle 52 with attach means 53 identical to the attach means 17 of FIG. 1. The receptacle also has an internally threaded opening 54 therethrough, and a counterbore 55 adjacent to the threads. There is a countersink 56 in the right-hand end of the receptacle intersecting the counterbore.

Body 51 has a dimple 57 surrounding an opening 58 therein. A countersink-type screw 59 passes through that opening. The screw, except for the countersink head, is identical to screw 36 in FIG. 2, having a shank 60 with a cylindrical portion 61, threads 62, tapered portion 63, and collar 64, in that order from the head. A retainer spring 65 surrounds the shank in the same manner as spring 42 in FIG. 2, and fits in the counterbore in the retainer.

The dimple fits in the countersink on the receptacle, and the countersunk head of the screw fits in the dimple. It will be seen that this embodiment is not only flush, but utilizes only a receptacle, the dimpled portion of body 51 acting as a "retainer."

FIG. 6 shows still another embodiment of the invention, wherein only a receptacle is utilized, but the installation is not flush. This embodiment is shown in FIG. 6 joining bodies 70, 71 together. The bodies have openings 72, 73, respectively, therethrough. A receptacle 74 has attach means 75 thereon which are identical to attach means 17 of FIG. 1. The receptacle has a threaded opening 76, which section is adjoined by a counterbore 77 which accommodates a spring 78 identical to retainer spring 42.

A flat-headed screw 79, which is identical to screw 36, passes through the opening in body 71 so that it can engage in the receptacle. The retainer spring serves to hold the screw to body 71. This device is another in which only a receptacle, and not a separate retainer is provided.

FIG. 7 shows still another embodiment of the invention. This embodiment is more suitable than the others for joining together heavier plates. It will be observed that in FIG. 6 the opening in body 70 had a greater diameter than the opening in body 71, so that the receptacle could be pressed into a thin plate, and the counterbore for the spring was made in the receptacle. In FIG. 7, the hole diameters are equal, and the spring is housed in a counterbore in one of the plates. In FIG. 7, bodies 80, 81 are joined together, there being a receptacle 82 having an internally threaded opening 83, and attach means 84 identical to attach means 17 in FIG. 1. The receptacle is fitted to the body at hole 84a. Body 81 has an opening 85 and a counterbore 86. A retainer spring 87, identical to spring 42, fits in the counterbore around a screw 88, which is identical to screw 59 in FIG. 5, the opening through body 81 having a countersink 89.

The presently-preferred embodiment of the invention is shown in FIGS. 8 and 9 wherein a pair of bodies 90, 91 are joined by a fastener utilizing a receptacle 92 which is identical to receptacle 12 of FIG. 1, this being attached in an opening 93 in body 90 by attach means 93a, identical to attach means 17. Opening 94 in body 81 receives a retainer 95, said retainer having attach means 96 identical to attach means 17 of FIG. 1. The retainer has an internal bore 97 which is smooth-walled except for a thread 98 at its right-hand end in FIG. 8. This is readily formed by threading the entire bore and then drilling the threads out of the left-hand end of the opening. A screw 99 is threaded through thread 98, and when its projects beyond the retainer is adapted to be threaded into the threaded opening of the receptacle.

A cover 100 includes a cylindrical outer wall 101, a spring seat 102, and a flange 103 which has a hole 104 to pass the shank of the screw. The flange then fits underneath the head of the screw. A spring 105 bears against the spring seat and a shoulder 106 on the retainer. The spring biases the screw to the right in FIG. 8. The screw is held against separation from the retainer by retaining means that comprise the thread 98. The screw can, of course, be removed, but only by unthreading the threads of the screw past threads 98.

The use of all of the embodiments should be evident from the above drawings, and their advantages should also be evident. The panel fastener may be tightened down as tightly as desired, with its elements drawing the bodies tightly against each other. The device may be made in a number of configurations which may either project beyond the work, or which may lie flush with the work. The screw, while it can be readily ejected from the receptacle, either by the retainer springs in FIGS. 1–7 or by spring 105 in FIG. 8, is readily dislodged from the retainer as soon as it is unthreaded by virtue of reaction between the retainer spring and the tapered section in FIGS. 1–7 and the constant bias force of spring 105 in FIG. 8.

The device is especially useful because of its ease of applying the fastener portions to their respective bodies. The screw is retained simply by either slipping a leaf spring on the screw to hold it to a retainer (when a retainer is used), or to hold it to one of the bodies when the body itself functions as a retainer. In every case the receptacle (and retainer when used) can be applied by pressing the parts into the plates, such as by the use of an arbor press, or even by the use of simple hand tools.

This invention is not to be limited by the embodiments shown in the drawings and described in the description which are given by way of example and not of limitation, but only in accordance with the scope of the appended claims.

I claim:

1. A panel fastener for joining a pair of bodies together, each body having a hole therein, said fastener comprising: a receptacle portion having a threaded opening extending axially therethrough; attaching means on one end of the receptacle for attaching the receptacle portion to a first of said bodies; a retainer portion having an axially-extending hole therethrough with a counterbore at one end face thereof; attaching means located on one end of said retainer for attaching the retainer portion to the second of said bodies, said counterbore and said attaching means being situated in and on a common end of said retainer portion; a threaded screw passing through the hole in the retainer portion and adapted to enter and engage the threaded opening of the receptacle portion, said screw comprising a shank externally threaded throughout a portion of its length, a head portion at one end of said shank, and a collar portion at the other end of said shank, said threaded portion terminating short of said collar portion, said shank being tapered from the terminus of said thread toward said collar portion; a retainer spring in said counterbore adapted to engage with the collar to keep the screw to the retainer portion, and to frictionally engage the counterbore thereby to prevent ready expulsion of the spring therefrom, both of said attaching means comprising a circular guide section adapted to enter and closely fit in the respective body hole to guide and align the respective portion therein, a groove in the exterior of the said portion adjacent to the guide section, a continuous, peripheral, sharp lip axially overhanging a portion of the groove, axial knurls in the exterior surface of the lip, and a shoulder adapted to abut the respective body, the lip serving to deflect a curl of body material into the groove to hold the portion to the body, the knurl serving to hold the portion against rotation, and the shoulder limiting the penetration of the retainer into the body.

2. A panel fastener according to claim 1 in which the retainer spring comprises a strip of resilient metal bent to form fingers adapted to engage the screw, and having portions between the fingers to engage the counterbore.

References Cited in the file of this patent

UNITED STATES PATENTS

| | | |
|---|---|---|
| 748,078 | Kaisling | Dec. 29, 1903 |
| 1,112,525 | Darling | Oct. 6, 1914 |
| 1,251,676 | McCaffray | Jan. 1, 1918 |
| 2,396,142 | Allen | Mar. 5, 1946 |
| 2,737,222 | Becker | Mar. 6, 1956 |
| 2,761,484 | Sternick | Sept. 4, 1956 |
| 2,767,950 | Bellon et al. | Oct. 23, 1956 |
| 2,921,616 | Threewit | Jan. 19, 1960 |
| 2,991,816 | Harbison et al. | July 11, 1961 |
| 3,000,420 | Spokes | Sept. 19, 1961 |

FOREIGN PATENTS

| | | |
|---|---|---|
| 222,528 | Australia | July 7, 1959 |
| 588,215 | Great Britain | May 16, 1947 |
| 596,697 | Great Britain | Jan. 8, 1948 |